United States Patent [19]
Hoshino et al.

[11] Patent Number: 5,791,558
[45] Date of Patent: Aug. 11, 1998

[54] HEATING SYSTEM FOR VEHICLE

[75] Inventors: Tatsuyuki Hoshino; Kenji Takenaka; Hidefumi Mori; Takashi Ban; Kiyoshi Yagi, all of Kariya, Japan

[73] Assignee: Kabushiki Kaisha Toyoda Jidoshokki Seisakusho, Kariya, Japan

[21] Appl. No.: 860,599

[22] PCT Filed: Nov. 5, 1996

[86] PCT No.: PCT/JP96/03231

§ 371 Date: Jul. 2, 1997

§ 102(e) Date: Jul. 2, 1997

[87] PCT Pub. No.: WO97/17219

PCT Pub. Date: May 15, 1997

[30] Foreign Application Priority Data

Nov. 6, 1995 [JP] Japan ................... 7-287048

[51] Int. Cl.$^6$ ................................................. B60H 1/00
[52] U.S. Cl. ................. 237/12.3 B; 122/26; 126/247
[58] Field of Search ................... 237/12.3 R, 12.3 B; 122/26; 126/247

[56] References Cited

U.S. PATENT DOCUMENTS

4,993,377  2/1991  Itakura .

Primary Examiner—Henry A. Bennett
Assistant Examiner—Derek S. Boles
Attorney, Agent, or Firm—Brooks Haidt Haffner & Delahunty

[57] ABSTRACT

A heating system for a vehicle is provided which does not require a large boarding space in an engine room very much, which can be manufactured at a reduced cost, and which can fully heat a passenger compartment of a vehicle when an engine is started. For instance, in the vehicle heating system, a water pump (WP) and a viscous heater (VH) is incorporated into an installation housing (1), a plate (2) and a cover (3) which are bonded to a cylinder block of an engine. The water pump (WP) and the viscous heater (VH) are driven by a drive shaft (11) which is shared by them. Moreover, the viscous heater (VH) includes an auxiliary water jacket (WJ$_2$). The auxiliary water jacket (WJ$_2$) is communicated with a main water jacket (WJ$_1$) of the engine by way of a pump chamber (4) of the water pump (WP), and is further communicated with a heater core for heating a passenger compartment of a vehicle.

13 Claims, 5 Drawing Sheets

HEATING SYSTEM FOR VEHICLE

TECHNICAL FIELD

The present invention relates to a heating system for a vehicle in which heat resulting from circulating water is used for heating a passenger compartment, etc., of a vehicle.

BACKGROUND ART

In a conventional general heating system for a vehicle, an engine housing (i.e., a component part of an engine) is constituted by a cylinder block, a cylinder head, and the like. In the cylinder block, there is disposed a built-in water pump which works as a complementary unit. Further, in the cylinder block, a water jacket is formed which is communicated with a pump chamber of the water pump. A drive shaft of the water pump is driven by an engine by way of a belt and a pulley. Furthermore, the water jacket is communicated with a radiator and a heater core by way of a water passage which can be opened and closed by a thermostat. Thus, circulating water is circulated in the water jacket, the pump chamber of the water pump, the water passage, the radiator, and the heater core.

Hence, in the conventional general heating system, the engine is cooled by the cold circulating water. Then, the circulating water is heated during the cooling of the engine, and the thus heated circulating water is utilized by the heater core to heat a passenger compartment, etc., of a vehicle. When the circulating water is heated excessively, the thermostat opens the water passage so that the circulating water is cooled by the radiator.

However, the conventional general heating system cannot fully heat a passenger compartment of a vehicle when the engine is started in a cold region, or the like, because the passenger-compartment heating operation depends solely on the heat generation of the engine.

In addition, when the engine is cold, and even when the engine tries to heat itself by closing the water passage with the thermostat, the engine cannot carry out the combustion optimally before it is heated to a certain extent by its own heat generation. Moreover, it is believed that the engine suffers from the problems which result from a low combustion efficiency and an exhaust gas.

Even if a complementary thermal source is provided independently of the engine in order to overcome the drawbacks, the construction around the engine is enlarged in size. Eventually, there arises a problem in that the space for boarding the complementary thermal source is reduced inevitably in the congested engine room. Moreover, the complementary thermal source requires a pulley, a drive shaft, etc., independently. As a result, the number of component parts increases to push up the manufacturing cost.

The present invention has been developed in view of the aforementioned conventional circumstances. It is therefore an assignment to the present invention to provide a heating system for a vehicle which does not require a large boarding space in an engine room very much, which can be manufactured at a reduced cost, and which can fully heat a passenger compartment of a vehicle when an engine is started.

Moreover, it is another assignment to the present invention to provide a heating system for a vehicle which can fully warm up an engine when the engine is started.

Measures for Solving the Assignment

A heating system for a vehicle set forth in claim 1 comprises:

a viscous heater including;

a heater housing in which a heat-generating chamber and an auxiliary water jacket are formed, the auxiliary water jacket disposed next to the heat-generating chamber;

a heater drive shaft held rotatably to the heater housing, and driven by an engine by way of a heater pulley;

a rotor disposed in the heat-generating chamber rotatably by the heater drive shaft; and a viscous fluid interposed in a space between a wall surface of the heat-generating chamber and an outer surface of the rotor, and caused to generate heat by rotation of the rotor;

a constituent part of the engine being shared by the heater housing of the viscous heater and the heater drive shaft thereof;

a heater core communicated the auxiliary water jacket of the heater housing of the viscous heater by way of a water passage; and circulating water being circulated in the auxiliary water jacket, the water passage and the heater core.

In the vehicle heating system set forth in claim 1, the rotor of the viscous heater is rotated in the heat-generating chamber when the heater drive shaft is driven by the engine by way of the heater pulley. Accordingly, the viscous heater is sheared to generate heat in the space between the wall surface of the heat-generating chamber and the outer surface of the rotor. The heat thus generated by the viscous fluid is heat-exchanged to the circulating fluid which is circulated in the auxiliary water jacket of the viscous heater. Then, the circulating water thus heated is circulated into the heater core by way of the water passage. As a result, the passenger-compartment heating operation depends not only on the heat generated by the engine, but also on the heat generated by the viscous heater.

Further, in the vehicle heating system set forth in claim 1, a constituent part of the engine is shared by at least one of the heater housing of the viscous heater and the heater drive shaft thereof. Consequently, the construction around the engine is not enlarged in size very much, and the number of the component parts can be reduced.

Therefore, the vehicle heating system set forth in claim 1 can fully heat a passenger compartment of a vehicle when the engine is started in a cold region, or the like, because the passenger-compartment heating operation depends not only on the heat generated by the engine, but also on the heat generated by the viscous heater.

Furthermore, the vehicle heating system set forth in claim 1 little requires a larger boarding space in an engine room, because the construction around the engine is not enlarged in size very much. Moreover, the vehicle heating system can be manufactured at a reduced cost, because the number of the component parts are reduced.

A heating system for a vehicle set forth in claim 2 is characterized in that, in the vehicle heating system set forth in claim 1, the shared constituent part of the engine is an engine housing, that the engine housing includes a built-in complementary unit, that the complementary unit has a complementary drive shaft which is driven by the engine by way of a complementary pulley, that the complementary pulley is shared by the heater pulley of the viscous heater, and that the complementary drive shaft is shared by the heater drive shaft of the viscous heater.

In the vehicle heating system set forth in claim 2, a pulley is shared by the complementary pulley and the heater pulley, and a drive shaft is shared by the complementary drive shaft and the heater drive shaft. Hence, when the drive shaft is driven by the engine by way of the pulley, the complementary unit functions, and simultaneously the rotor of the viscous heater is rotated in the heat-generating chamber.

Moreover, in the vehicle heating system set forth in claim 2, the construction around the engine is not enlarged in size very much, because there is disposed the built-in viscous heater in the engine housing. At the same time, the built-in complementary unit does not require a pulley, a drive shaft, etc., independently, because the rotor of the viscous heater can be rotated by the heater pulley and the heater drive shaft, which are shared respectively by the complementary pulley and the complementary drive shaft of the complementary unit. As a result, the number of component parts can be reduced.

Note that the vehicle heating system as set forth in claim 2 can employ a water pump, a vacuum pump, or the like, recited in claim 5 below, as the complementary unit, which is incorporated into the engine housing so that the complementary drive shaft and the complementary pulley are shared respectively by the heater drive shaft of the viscous heater and the heater pulley thereof. When the complementary unit is a water pump, a vacuum pump, or the like, it is possible to obviate an electromagnetic clutch, because the complementary drive shaft can be driven continuously.

Thus, the vehicle heating system set forth in claim 2 does not require a pulley, a drive shaft, etc., independently for the complementary unit, and does not require a large boarding space in an engine room so much. In addition, the vehicle heating system can be manufactured at a reduced cost, because the number of the component parts is reduced.

A heating system for a vehicle set forth in claim 3 is characterized in that the engine housing of the vehicle heating system set forth in claim 2 includes a main water jacket formed therein, that the water passage thereof includes a main water passage, which can be opened and closed by a thermostat, and which is communicated with the main water jacket and a radiator, and that the circulating water is circulated in the main water jacket, the main water passage and the radiator.

When the engine is cold, the vehicle heating system set forth in claim 3 operates as follows: namely; the viscous heater generates heat to heat the circulating water, and the thus heated circulating water is circulated in the main water jacket. Accordingly, the engine can carry out the combustion optimally in a short period of time, because it is warmed up not only by its own heat generation but also by the heat generation of the viscous heater. When the engine is fully warmed up by its own heat generation, the thermostat opens up the main water passage so that the radiator cools the circulating water. As a result, the vehicle heating system cools the engine so that the engine is not heated more than necessary. In this instance, it is preferred to employ a variable capacity type viscous heater, set forth in claim 7 below, as the viscous heater.

Thus, the vehicle heating system set forth in claim 3 enables the engine to optimally carry out the combustion in a short period of time, because the engine can be warmed up by its own heat generation as well as by the heat generation of the viscous heater when the engine is cold. Consequently, the vehicle heating system can effect advantages in terms of the combustion efficiency of the engine and the exhaust gas emitted therefrom.

A heating system for a vehicle set forth in claim 4 is characterized in that the circulating water of the vehicle heating system set forth in claim 1, 2 or 3 is circulated into the heater core by way of the auxiliary water jacket of the heater housing of the viscous heater.

In the vehicle heating system set forth in claim 4, the circulating water is heated by the heat generation of the viscous heater even when the engine is cold. The thus heated circulating water can be utilized to heat a passenger compartment of a vehicle.

Hence, the vehicle heating system set forth in claim 4 can carry out the passenger-compartment heating operation more optimally.

A heating system for a vehicle set forth in claim 5 is characterized in that the complementary unit of the vehicle heating system set forth in claim 2, 3 or 4 is a water pump.

The vehicle heating system set forth in claim 5 embodies the complementary unit of the vehicle heating system set forth in claim 2, 3 or 4. Its operations will be described in the section of "Best Mode for Carrying Out the Invention".

A heating system for a vehicle set forth in claim 6 is characterized in that the water pump of the vehicle heating system set forth in claim 5 is disposed so as to deliver the circulating water from the main water jacket of the engine to the auxiliary water jacket of the heater housing of the viscous heater; the water pump is disposed so as to deliver the circulating water from the auxiliary water jacket of the heater housing of the viscous heater to the heater core; or the water pump is disposed so as to deliver the circulating water from the heater core to the main water jacket of the engine.

The vehicle heating system set forth in claim 6 embodies the measures recited in claim 5. In particular, when the water pump is disposed so as to deliver the circulating water from the main water jacket of the engine to the auxiliary water jacket of the heater housing of the viscous heater, the auxiliary water jacket can be readily communicated with the main water jacket formed in the engine housing, because the auxiliary water jacket is positioned adjacent to a pump chamber of the water pump. In this instance, no intricate water passage is required, because the auxiliary water jacket can be readily communicated with the main water jacket. Thus, it is possible to realize to downsize the construction around the engine. As a result, the vehicle heating system can achieve offering good boardability within an engine room.

A heating system for a vehicle set forth in claim 7 is characterized in that the viscous heater of the vehicle heating system set forth in claim 1, 2, 3, 4, 5 or 6 is a variable capacity type viscous heater which includes a control chamber communicated with a central region of the heat-generating chamber, and in which the viscous fluid is collected from the heat-generating chamber into the control chamber at lest by Weissenberg effect of the viscous fluid in capacity reduction.

In the vehicle heating system set forth in claim 7, when the heat generated by the engine is fully utilized to heat a passenger compartment of a vehicle and to heat the engine itself, the heat-generating capability of the viscous heater can be reduced by collecting the viscous fluid from the heat-generating chamber into the control chamber by means of the Weissenberg effect. Accordingly, the viscous heater can be operated so as not to impair the circulating-water cooling by the radiator and eventually not to impair the engine cooling by the circulating water.

In accordance with the vehicle heating system set forth in claim 7, the cooing of the engine cannot be impaired after the heat generated by the engine is fully utilized to heat a passenger compartment of a vehicle and to warm up the engine itself. As a result, it is possible to solve the problems which are caused by overheating the engine.

A heating system for a vehicle set forth in claim 8 is characterized in that the heater core of the vehicle heating system set forth in claim 3, 4, 5, 6 or 7 is communicated with the water passage on an upstream side with respect to the thermostat.

In the vehicle heating system set forth in claim 8, when the circulating water is cold, and when the thermostat closes the water passage, the viscous heater can heat the circulating water by a small flow rate.

Thus, vehicle heating system set forth in claim 8 can not only heat a passenger compartment of a vehicle but also warm up the engine in a short period of time after the engine is started, because the viscous heater can heat the circulating water by a small flow rate.

A heating system for a vehicle set forth in claim 9 is characterized in that the water passage, disposed on an upstream side with respect to the thermostat, of the vehicle heating system set forth in claim 3, 4, 5, 6, 7 or 8 is divided into a heating water passage, which is communicated with the heater core, and a warming-up water passage, which short-circuits around the radiator and is communicated with the main water jacket of the engine housing, by a 3-way valve.

In the vehicle heating system set forth in claim 9, the flow of the circulating water can be divided into a flow thereof flowing in the heating water passage and another flow thereof flowing in the warming-up water passage by switching the 3-way valve manually or automatically. Consequently, the circulating water heated by the viscous heater or the engine can be utilized to preferentially heat the passenger compartment or the engine.

A heating system for a vehicle set forth in claim 10 is characterized in that the water passage of the vehicle heating system set forth in claim 3, 4, 5, 6, 7, 8 or 9 has a bypass water passage which bypasses the auxiliary water jacket of heater housing of the viscous heater, and that the circulating water is made to circulate in the bypass water passage as well.

In the vehicle heating system set forth in claim 10, the bypass passage circulates the circulating water, heated by the heat generation of the engine, in the water passage so as not to flow in the auxiliary water passage. Accordingly, the circulating water is subjected to a small flow-passage resistance.

Thus, in the vehicle heating system set forth in claim 10, the circulating water is subjected to a small flow-passage resistance. As a result, it is possible to achieve the reduction on the water pump powder.

BEST MODE FOR CARRYING OUT THE INVENTION (First Preferred Embodiment)

Figure 1:
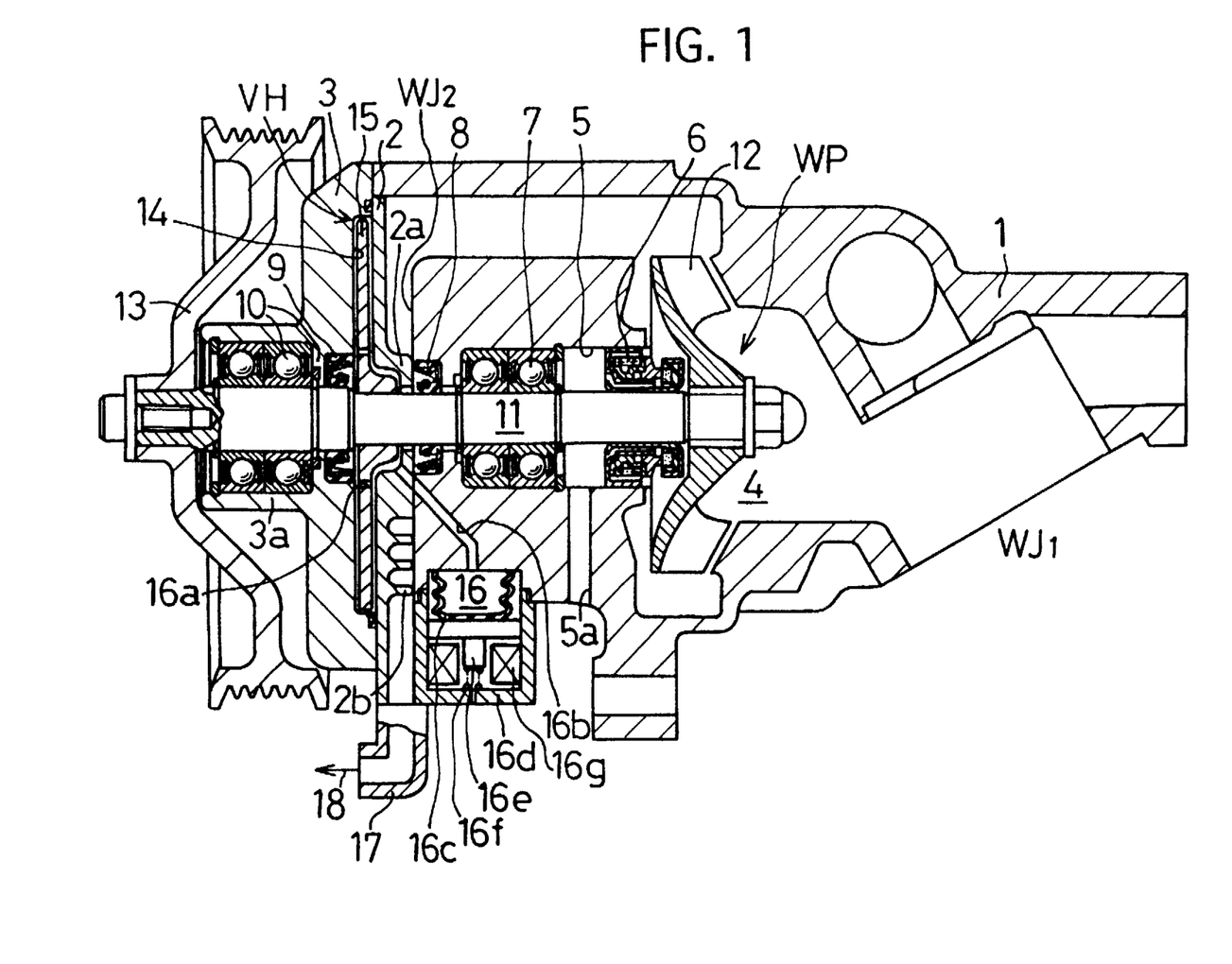
FIG. 1 is a vertical cross-sectional view on major portions in a vehicle heating system of a First Preferred Embodiment.

As illustrated in FIG. 1, in the vehicle heating system, an installation housing 1 is bonded to a cylinder block of an engine (not shown). To the installation housing 1, a cover 3 is bonded by way of a plate 2. Here, the cylinder block and the installation housing 1 constitute the engine housing (i.e., a constituent part of the engine), and the installation housing 1, the plate 2 and the cover 3 constitute a heater housing of a viscous heater.

In the installation housing 1, a pump chamber 4 is formed. The pump chamber 4 is communicated with a main water jacket $WJ_1$ of the cylinder block of the engine. The pump chamber 4 is further communicated with an auxiliary water jacket $WJ_2$ which is formed by the installation housing 1 and the plate 2. On a rear-end surface of the plate 2 (i.e., a right hand side of the plate 2 in FIG. 1), a cylinder-shaped convexity 2a is protruded at the central region. Moreover, on the rear-end surface of the plate 2, a plurality of projections 2b are further formed around the bottom half of the convexity 2a, and are protruded in an axial direction. The convexity 2a and the projections 2b are brought into contact with the installation housing 1. In addition, a pipe 17 is bonded to the plate 2 and the installation housing 1. The pipe 17 is communicated with the auxiliary water jacket $WJ_2$, and is further communicated with a main water passage 18 shown in FIG. 2.

Further, as illustrated in FIG. 1, an axial hole 5 is drilled through the installation housing 1, the plate 2 and the cover 3, and is shared by them. The axial hole 5 is opened into the pump chamber 4 and a boss 3a formed in the cover 3. In the axial hole 5 formed in the installation housing 1, a mechanical seal 6, a bearing apparatus 7 and an oil seal 8 are disposed in this order from the side of the pump chamber 4. In the axial hole 5 formed in the cover 3 and the boss 3a, an oil seal 9 and a bearing apparatus 10 are disposed in this order from the side of the pump chamber 4. A drive shaft 11 is held rotatably by the mechanical seal 6, the bearing apparatuses 7, 10 and the oil seals 8, 9, and is sealed by them. At a trailing end of the drive shaft 11, an impeller 12 is fixed. At a leading end of the drive shaft 11, a pulley 13 is fixed. The pulley 13 is driven by the engine via a belt. Thus, the drive shaft 11 is shared by a heater drive shaft and a complementary-unit drive shaft, and the pulley 13 is shared by a heater pulley and a complementary-unit pulley. The axial hole 5 is communicated with a drain hole 5a which is disposed between the mechanical seal 6 and the bearing apparatus 7.

Furthermore, in a rear-end surface of the cover 3, a concavity is dented, and forms a heat-generating chamber 14 together with a flat front-end surface of the plate 2. The heat-generating chamber 14 neighbors the auxiliary water jacket $WJ_2$. In the heat-generating chamber 14, a flat disk-shaped rotor 15 is press-fitted around the drive shaft 11 on a slightly leading-end side with respect to the center thereof. Thus, the rotor 15 can rotate in the heat-generating chamber 14.

Silicone oil is interposed in the space between the wall surface of the heat-generating chamber 14 and the outer surface of the rotor 15. The silicone oil works as the viscous fluid.

In a central region of the rotor 15, a plurality of apertures 16a are drilled through in an axial direction. In the plate 2 and installation housing 1, a control hole 16b is drilled through. The control hole 16b is communicated with a central region of the heat-generating chamber 14 at an opposite opening, and is enclosed by a bellows 16c at another opposite opening. The bellows 16c is fixed to the installation housing 1. In the bellows 16c, a control chamber 16 is formed. The bellows 16c is brought into contact with a spool 16e at the bottom end. The spool 16e is disposed slidably in a cover member 16d which is bonded to the installation housing 1. A presser spring 16f is disposed between the cover member 16d and the spool 16e. Accordingly, the spool 16e is urged by the presser spring 16f in a direction so that it can reduce the internal volume of the control chamber 16. In addition, the spool 16e is actuated by a solenoid 16g, which is energized or demagnetized by an external input, so that it can enlarge the internal volume of the control chamber 16 due to the solenoid 16g energized.

The heater housing and engine housing are thus constituted by the installation housing 1, the plate 2 and the cover 3. Into the heater housing and engine housing, a water pump WP, and the variable capacity type viscous heater VH are incorporated. The water pump WP works as the complementary unit, and is constituted by the pulley 13, the drive shaft 11, the impeller 12, the pump chamber 4, etc. The viscous heater VH is constituted by the pulley 13, the drive shaft 11, the heat-generating chamber 14, the rotor 15, the silicone oil, and the auxiliary water jacket $WJ_2$.

Figure 2:
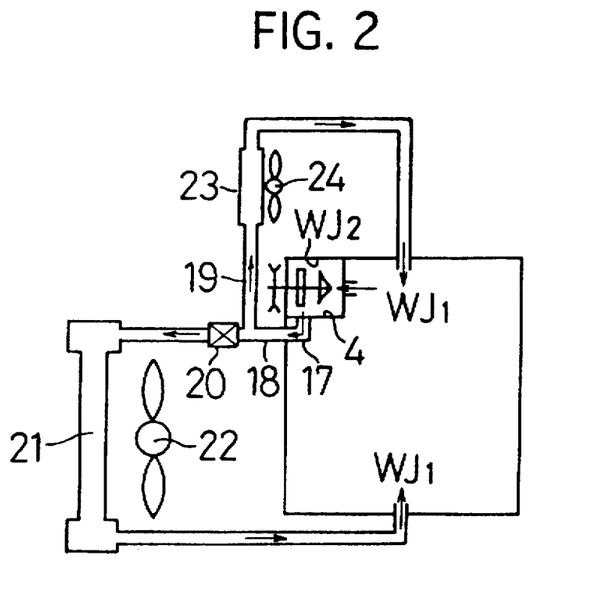
FIG. 2 is an overall construction diagram of the vehicle heating system of the First Preferred Embodiment.

As illustrated in FIG. 2, the main water passage 18 is divided into an auxiliary water passage 19, and is subsequently connected to a thermostat 20. The main water passage 18 is further communicated with a radiator 21, and is subsequently communicated with the main water jacket $WJ_1$. The radiator 21 is disposed so as to face a cooling fan 22. Whilst, the auxiliary water passage 19 is communicated with a heater core 23, and is subsequently communicated with the main water jacket $WJ_1$. The heater core 23 is disposed so as to face a passenger-compartment heating fan 24. Circulating water is filled in the main water jacket $WJ_1$, the pump chamber 4, the auxiliary water jacket $WJ_2$, the pipe 17, the main water passage 18, the radiator 21, the auxiliary water passage 19 and the heater core 23. Hence, the circulating water is flowed from the main water jacket $WJ_1$ of the engine, and flowed into the pipe 17 by way of the pump chamber 4 and the auxiliary water jacket $WJ_2$. Then, the circulating water is returned from the radiator 21 to the main water jacket $WJ_1$ by way of the main water passage 18. At the same time, the circulating water is flowed into the heater core 23 by way of the main water passage 18 and the auxiliary water passage 19, and is subsequently returned from the heater core 23 to the main water jacket $WJ_1$.

In the thus arranged vehicle heating system, the impeller 12 of the water pump WP is rotated when the drive shaft 11 (shown in FIG. 1) is driven by the engine by way of the pulley 13. Accordingly, the circulating water is circulated in the water jacket $WJ_1$, etc. And the rotor 15 in the heat-generating chamber 14 is rotated integrally with the impeller 12. Consequently, the silicone oil is sheared in the space between the wall surface of the heat-generating chamber 14 and the outer surface of the rotor 15, thereby generating heat. The resulting heat is heat-exchanged to the circulating water which is circulated in the auxiliary water jacket $WJ_2$ of the viscous heater VH. Then, the thus heated circulating water is circulated into the heater core 23 by way of the auxiliary water passage 19 (shown in FIG. 2). Hence, not only the heat generated by the engine, but also the heat generated by the viscous heater VH are utilized to heat a passenger compartment of a vehicle. The heating is carried out even when the engine is cold, because the circulating water is circulated into the heater core 23 by way of the auxiliary water jacket $WJ2_2$ of the viscous heater VH. As a result, the vehicle heating system can fully heat a passenger compartment of a vehicle in a cold region, or the like, as soon as when the engine is started.

Further, even when the engine is cold, the engine can be warmed up by its own heat generation as well as the heat generation of the viscous heater VH, because the circulated water, heated by the heat generation of the viscous heater VH, is circulated into the main water jacket $WJ_1$. Therefore, the engine can be warmed up not only by its own heat generation but also by the heat generation of the viscous heater VH. As a result, the engine can carry out the combustion optimally in a short period of time.

In particular, in the vehicle heating system, the viscous heater VH can heat the circulating water by a small flow rate when the circulating water is so cold that the thermostat 20 closes the main water passage 18 in order to stop the flow to the radiator 21. As a result, the heating of a passenger compartment of a vehicle and the warming-up of the engine can be carried out in a short period of time after the engine is started.

Furthermore, the thermostat 20 opens the main water passage 18 when the engine is fully warmed up by its own heat generation. The radiator 21 cools the circulating water so that the engine is not heated more than necessary. In this instance, the solenoid 16 (shown in FIG. 1) is energized by an external input. Accordingly, the spool 16e enlarges the internal volume of the control chamber 16 by moving downward against the presser spring 16f. Consequently, the silicone oil, held in the heat-generating chamber 14, is collected into the control chamber 16 by the Weissenberg effect by way of the control hole 16b. Note that, during the collection, the silicone oil, placed on a side of a front-end surface of the rotor 15, is likely to reach the control hole 16b by way of the central apertures 16a. The vehicle heating system can thus reduce the heating ability of the viscous heater VH so as not to impair the cooling of the circulating water by the radiator 21 (shown in FIG. 2) as well as the cooling of the engine by the radiator 21. All in all, the vehicle heating system can produce advantageous effects in terms of combustion efficiency and exhaust gas, and can simultaneously solve the problems resulting from overheating the engine.

When the engine is re-started, and when the temperature of the cooling water is lower than the predetermined temperature, the thermostat 20 (shown in FIG. 2) closes the main water passage 18. Accordingly, the circulating water is heated by the heat generated by the viscous heater VH, and is circulated into the heater core 23 and the main water jacket $WJ_1$. In this instance, the solenoid 16g (shown in FIG. 1) is demagnetized, and thereby the spool 16e yields to the presser spring 16f to reduce the internal volume of the control chamber 16. Consequently, the silicone oil, held in the control chamber 16, is returned into the heat-generating chamber 14 by way of the control hole 16b. In the mean time, the silicone oil is likely to arrive at a front-end-surface side of the rotor 15. The vehicle heating system of the First Preferred Embodiment thus restores the heat-generating capacity of the viscous heater VH.

Further, in the vehicle heating system of the First Preferred Embodiment, the construction around the engine is not enlarged in size very much, because the viscous heater VH incorporated into the engine housing. Furthermore, in the vehicle heating system, the viscous heater VH does not require a pulley, a drive shaft, an electromagnetic clutch, etc., independently, because the rotor 15 of the viscous heater VH is held rotatably to the drive shaft 11 which is shared by the drive shaft of the water pump WP. Thus, the arrangement of the vehicle heating system hardly increases the number of component parts. In particular, in the vehicle heating system, the auxiliary water jacket $WJ_2$ is likely to be communicated with the main water jacket $WJ_1$, because the auxiliary water jacket $WJ_2$ of the viscous heater VH is positioned adjacent to the pump chamber 4 of the water pump WP. As a result, the vehicle heating system does not require a complicated water passage. Thus, it is possible to realize to further downsize the construction around the engine. All in all, the vehicle heating system can not only bring about good boardability within the engine room, but also achieve reduction in the manufacturing cost.

(Second Preferred Embodiment)

Figure 3:
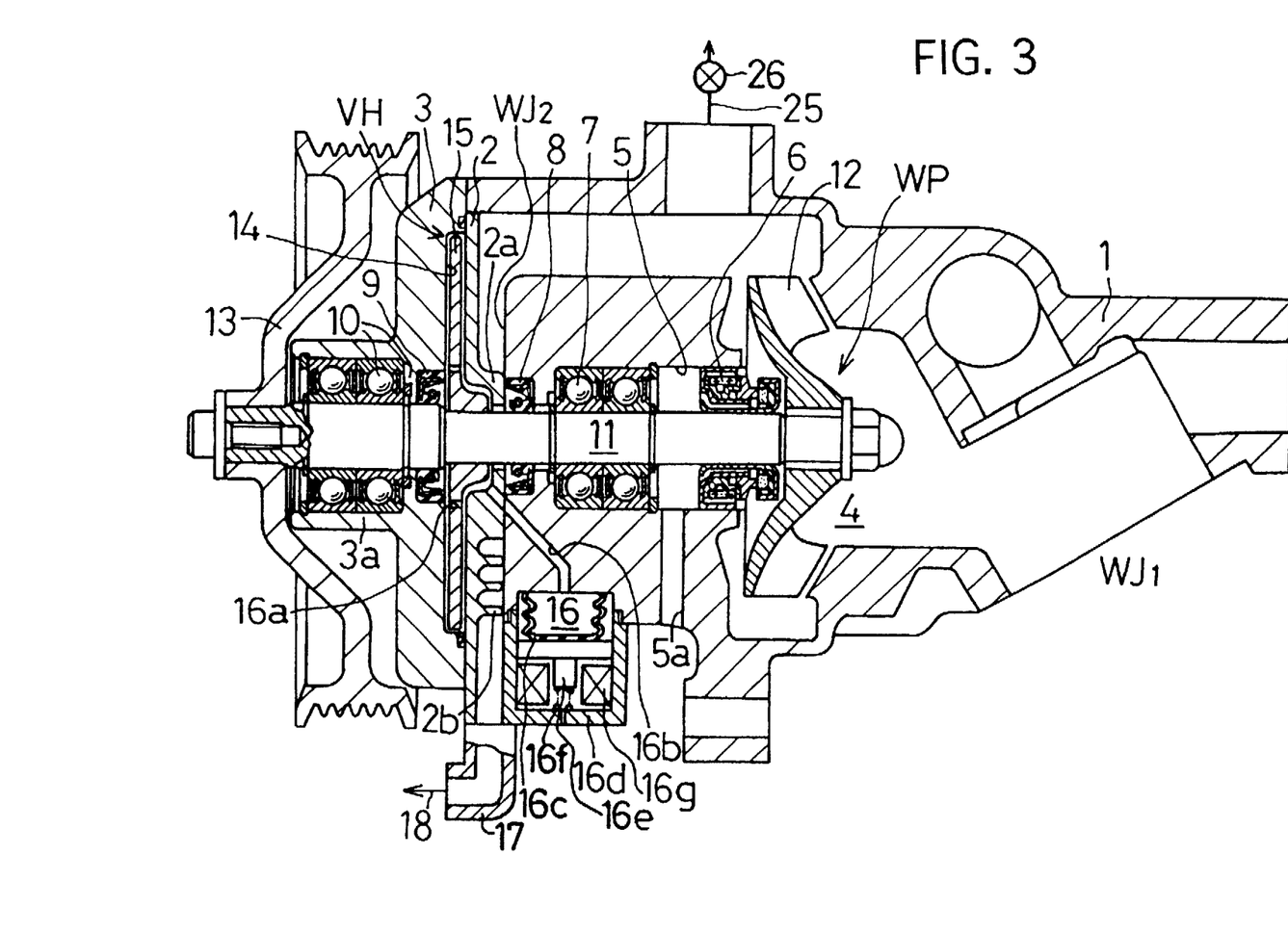
FIG. 3 is a vertical cross-sectional view on major portions in a vehicle heating system of a Second Preferred Embodiment.
Figure 4:
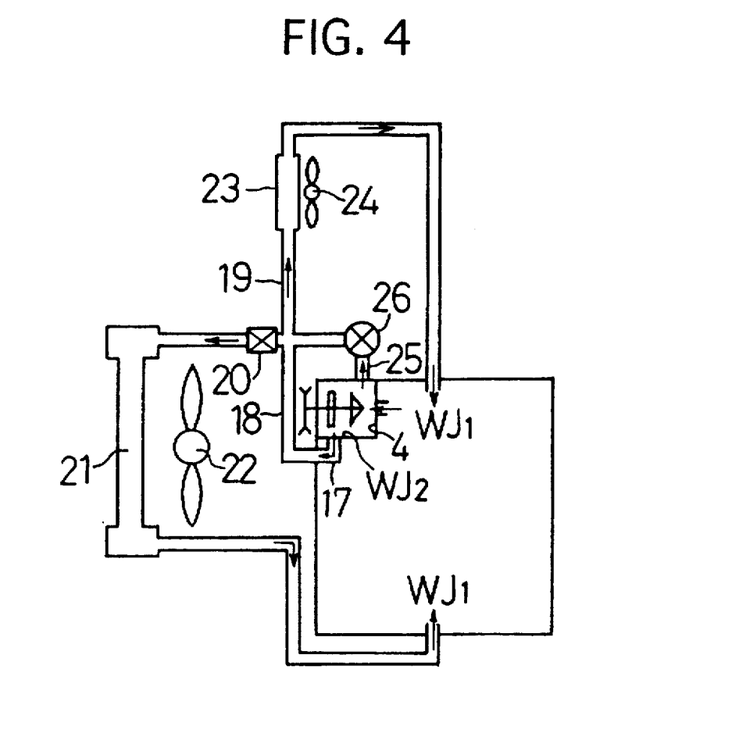
FIG. 4 is an overall construction diagram of the vehicle heating system of the Second Preferred Embodiment.

As illustrated in FIGS. 3 and 4, in the vehicle heating system, a bypass passage 25 is disposed between a pump chamber 4 and an auxiliary water jacket $WJ_2$ so as to communicate the pump chamber 4 with the auxiliary water jacket $WJ_2$. The bypass passage 25 is provided with an opening-and-closing valve 26, and is further communicated with a main water passage 18 and an auxiliary water passage 19 on an upstream side with respect to a thermostat 20. The bypass passage 25 also holds circulating water therein.

The valve 26 is opened when the temperature of the circulating water is higher than the predetermined temperature (i.e., when the circulating water is sufficiently warmed up.). Unless otherwise specified, the Second Preferred Embodiment has the same arrangements as those the First Preferred Embodiment. Accordingly, the same arrangements will be described with the same reference numerals as those of the First Preferred Embodiment.

In the thus constructed vehicle heating system, when the circulating water is heated by the heat generation of the engine, the opening-and-closing valve 26 is actuated to open the bypass passage 25. Accordingly, the bypass passage 25 flows the hot circulating water so as not to circulate by way of the auxiliary water jacket $WJ_2$, but to directly circulate in the main water passage 18 and the auxiliary water passage 19. Consequently, the circulating water is subjected to a small flow-passage resistance. As a result, the vehicle heating system of the Second Preferred Embodiment can make it possible to reduce the power of the water pump WP. Unless otherwise specified, the Second Preferred Embodiment operates and produces advantages in the same manner as the First Preferred Embodiment.

(Third Preferred Embodiment)

Figure 5:
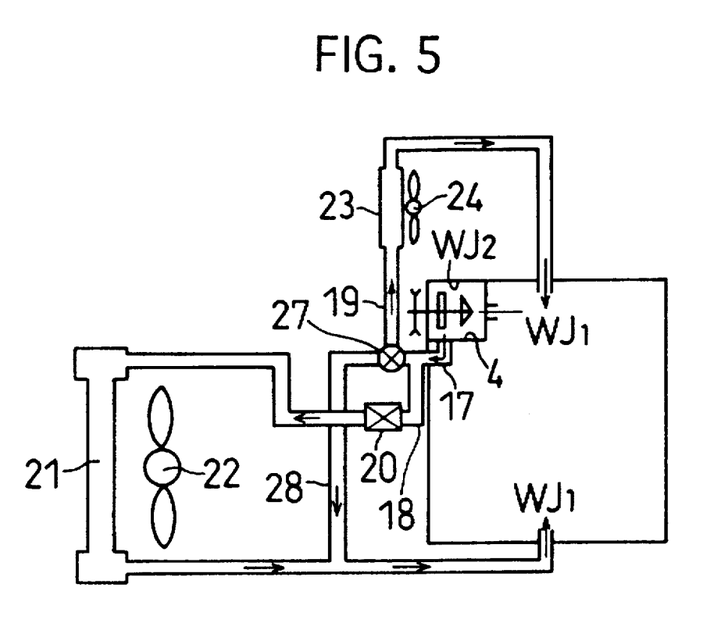
FIG. 5 is an overall construction diagram of a vehicle heating system of a Third Preferred Embodiment.

As illustrated in FIG. 5, in the vehicle heating system, a main water passage 18 is connected with an inlet port of a 3-way valve 27 on an upstream side with respect to a thermostat 20. Further, an auxiliary water passage 19 is connected with one of the outlet ports of the 3-way valve 27. Note that the auxiliary water passage 19 is the heating water passage for heating a passenger compartment of a vehicle, and is communicated with a heater core 23. Furthermore, a warming-up water passage 28 for warming up an engine is connected with another one of the outlet ports of the 3-way valve 27, and is communicated with a main water jacket $WJ_1$. Thus, the warming-up water passage 28 short-circuits around a radiator 21: namely; it short-circuits between an upstream side of the main water passage 18 with respect to the radiator 21 and a downstream side thereof. The 3-way valve 27 can be switched automatically in accordance with the temperature of a passenger room of a vehicle and the temperature of the circulating water. Unless otherwise specified, the Third Preferred Embodiment has the same arrangements as those the First Preferred Embodiment. Accordingly, the same arrangements will be described with the same reference numerals as those of the First Preferred Embodiment.

In the thus constructed vehicle heating system, the 3-way valve 27 automatically flows the circulating water to the auxiliary water passage 19 when the temperature of a passenger compartment of a vehicle is lower than a first designated temperature. In this instance, the resulting circulating-water circuit is equivalent to that of the First Preferred Embodiment. Accordingly, the passenger compartment is heated preferentially. Whilst, the 3-way valve 27 automatically flows the circulating water to the warming-up water passage 28 when the temperature of the passenger compartment is higher than the first designated temperature. In this instance, the engine is warmed up preferentially over the heating of the passenger compartment. On the other hand, the 3-way valve 27 does not automatically flow the circulating water to the auxiliary water passage 19 and the warming-up water passage 28, but it flows the circulating water to the main water passage 18 alone when the temperature of the circulating water is higher than a second designated temperature. The thermostat 20 is opened when the circulating water is at the second designated temperature. In this instance, the passenger-compartment heating and the engine warming-up are not carried out, but the radiator 21 cools the cooling water (i.e., circulating water) actively.

In the above-described Third Preferred Embodiment, the temperature of the circulating water can be detected in the main water jacket $WJ_1$, or it can be detected in the pipe 17. Moreover, it is not absolutely necessary to switch the 3-way valve 27 by the temperature of the circulating water in the aforementioned manner.

In the First through Third Preferred Embodiments, the engine housing is shared by the heater housing of the viscous heater VH. As a modified version, a cam shaft or crank shaft of the engine can be shared by the heater drive shaft of the viscous heater VH. For example, when a camshaft of the engine is shared by the heater drive shaft of the viscous heater VH, a camshaft can be prolonged slightly so as to be shared by the heater drive shaft of the viscous heater VH, and simultaneously a head cover of the engine is utilized as the heater housing of the viscous heater VH. This modified arrangement results from the fact that a camshaft is usually extended in a head cover of an engine.

Further, as another modified version of the First through Third Preferred Embodiments, the water pump WP and the viscous heater VH can be disposed reversely with respect to the cylinder block of the engine. In this instance, the main water jacket $WJ_1$ is directly communicated with the auxiliary water jacket $WJ_2$, and the auxiliary water jacket $WJ_2$ is communicated with the pump chamber 4.

Furthermore, as still another modified version of the First through Third Preferred Embodiments, it is not absolutely necessary to integrally fabricate the complementary drive shaft of the water pump WP and the heater drive shaft of the viscous heater VH. For example, the complementary drive shaft and the heater drive shaft can be disposed parallelly so that they can be driven synchronously by gears, etc.

Note that, in the First through Third Preferred Embodiments, the viscous heater VH employs a flat plate-shaped rotor whose axial length is shorter than a radius measured from the axial center. However, the First through Third Preferred Embodiments can employ a variety of viscous heaters, for example, a viscous heater whose rotor is formed as a cylinder shape having an axial length longer than a radius measured from the axial center; or a viscous heater whose rotor is provided with a labyrinth groove dented therein.

As a modified version of the Third Preferred Embodiment, the 3-way valve 27 can be arranged so that it is switched manually. In this instance, a switch for demanding the heating of the passenger compartment, and another switch for demanding the warming-up of the engine can be provided as an option when a switch for demanding the heat generation by the viscous heater VH is turned on.

As another modified version of the Third Preferred Embodiment, the 3-way valve 27 can be switched in accordance with a demand for heating made by a passenger. For instance, in the case where the demand for heating is made by a passenger, the 3-way valve 27 can be switched automatically to flow the circulating water to the auxiliary water passage 19 not only when the viscous heater VH is actuated while the engine is cold, but also when the engine is fully warmed up and thereby the circulating water is heated by the heat generation of the engine so that the viscous heater VH reduces the heating capacity as described in the First Preferred Embodiment. Note that, in this instance, the 3-way valve 27 can be switched manually. On the other hand, in the other case where the demand for heating is not made by a passenger, the 3-way valve 27 can be switched automatically to flow the circulating water to the warming-up water passage 28 even when the viscous heater VH is actuated to fully warm up the engine while the engine is cold. Note that, in this instance as well, the 3-way valve 27 can be switched manually. After the engine is fully warmed up, the 3-way valve 27 can be switched automatically so as not to flow the circulating water to the auxiliary water passage 19 and warming-up water passage 28, but to flow the circulating water to the main water passage 18 only. Note that, in this instance as well, the 3-way valve 27 can be switched automatically. In addition, the modified version can be further provided with control means for controlling the thus arranged 3-way valve 27 in accordance with a demand for heating made by a passenger.

We claim:

1. A heating system for a vehicle, comprising:
   a viscous heater including;
      a heater housing in which a heat-generating chamber and an auxiliary water jacket are formed, the auxiliary water jacket disposed next to the heat-generating chamber;
      a heater drive shaft held rotatably to said heater housing, and driven by an engine by way of a heater pulley;
      a rotor disposed in said heat-generating chamber rotatably by said heater drive shaft; and
      a viscous fluid interposed in a space between a wall surface of said heat-generating chamber and an outer surface of said rotor, and caused to generate heat by rotation of said rotor;
   a constituent part of said engine being shared by said heater housing of said viscous heater and said heater drive shaft thereof;
   a heater core communicated said auxiliary water jacket of said heater housing of said viscous heater by way of a water passage; and
   circulating water being circulated in said auxiliary water jacket, said water passage and said heater core.

2. A heating system for a vehicle according to claim 1, wherein said shared constituent part of said engine is an engine housing; said engine housing includes a built-in complementary unit; the complementary unit has a complementary drive shaft which is driven by said engine by way of a complementary pulley; the complementary pulley is shared by said heater pulley of said viscous heater; and the complementary drive shaft is shared by said heater drive shaft of said viscous heater.

3. A heating system for a vehicle according to claim 2, wherein said engine housing includes a main water jacket formed therein; said water passage includes a main water passage, which can be opened and closed by a thermostat, and which is communicated with the main water jacket and a radiator; and said circulating water is circulated in said main water jacket, the main water passage and the radiator.

4. A heating system for a vehicle according to claim 1, wherein said circulating water is circulated into said heater core by way of said auxiliary water jacket of said heater housing of said viscous heater.

5. A heating system for a vehicle according to claim 2, wherein said complementary unit is a water pump.

6. A heating system for a vehicle according to claim 5, wherein said water pump is disposed so as to deliver said circulating water from said main water jacket of said engine to said auxiliary water jacket of said heater housing of said viscous heater.

7. A heating system for a vehicle according to claim 1, wherein said viscous heater is a variable capacity type viscous heater which includes a control chamber communicated with a central region of said heat-generating chamber, and in which said viscous fluid is collected from said heat-generating chamber into the control chamber at least by Weissenberg effect of said viscous fluid in capacity reduction.

8. A heating system for a vehicle according to claim 3, wherein said heater core is communicated with said water passage on an upstream side with respect to said thermostat.

9. A heating system for a vehicle according to claim 3, wherein said water passage, disposed on an upstream side with respect to said thermostat, is divided into a heating water passage, which is communicated with said heater core, and a warming-up water passage, which short-circuits around said radiator and is communicated with said main water jacket of said engine housing, by a 3-way valve.

10. A heating system for a vehicle according to claim 3, wherein said water passage has a bypass water passage which bypasses said auxiliary water jacket of said heater housing of said viscous heater; and said circulating water is made to circulate in the bypass water passage as well.

11. A heating system according to claim 5, wherein said water pump is disposed so as to deliver said circulatory water from said auxiliary water jacket of said heater housing of said viscous heater to said heater core.

12. A heating system according to claim 5, wherein said water pump is disposed so as to deliver said circulating water from said heater core to said main water jacket of said engine.

13. A heating system for heating a passenger compartment of a vehicle, said heating system comprising:
   an engine including an engine housing, and a main water jacket formed in the engine housing;
   a heater core for heating the passenger compartment, said heater core connected with the main water jacket via a water passage way;
   a water pump built into the engine housing for circulating water between the main water jacket and said heater core;
   a drive shaft supported rotatably by the engine housing, said drive shaft driven by said engine to drive said water pump; and
   a heat generator disposed on said engine, said heat generator comprising:
      a heater housing fastened to the engine housing to form a heat generating chamber and auxiliary water jacket between said heater housing and the engine housing, the auxiliary water jacket arranged adjacent to the heat generating chamber and connected with the main water jacket and said heater core; and
      a rotor disposed in the heat generating chamber which is filled with viscous fluid, said rotor driven by said drive shaft.

* * * * *

UNITED STATES PATENT AND TRADEMARK OFFICE
CERTIFICATE OF CORRECTION

PATENT NO. : 5,791,558
DATED : August 11, 1998
INVENTOR(S) : T. Hoshino et al.

It is certified that error appears in the above-identified patent and that said Letters Patent is hereby corrected as shown below:

Column 9, line 10, change "SO" to --so--.

Column 12, line 62, delete "and" (second occurrence) and insert --a constituent part of said engine being shared by said heater housing of said viscous heater and said heater drive shaft thereof; and--.

Signed and Sealed this

Eighth Day of December, 1998

Attest:

BRUCE LEHMAN

*Attesting Officer*  *Commissioner of Patents and Trademarks*